United States Patent
Wäller et al.

(10) Patent No.: US 8,952,902 B2
(45) Date of Patent: Feb. 10, 2015

(54) DISPLAY AND CONTROL DEVICE FOR A MOTOR VEHICLE AND METHOD FOR OPERATING THE SAME

(75) Inventors: Christoph Wäller, Braunschweig (DE); Katharina Bachfischer, Düsseldorf (DE); Lennart Bendewald, Wolfsburg (DE); Heino Wengelnik, Wolfsburg (DE); Matthias Heimermann, Wolfenbüttel (DE); Jan-Lars Dalchow, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 402 days.

(21) Appl. No.: 12/936,710

(22) PCT Filed: Apr. 7, 2009

(86) PCT No.: PCT/EP2009/002772
§ 371 (c)(1),
(2), (4) Date: Dec. 14, 2010

(87) PCT Pub. No.: WO2009/124782
PCT Pub. Date: Oct. 15, 2009

(65) Prior Publication Data
US 2011/0109578 A1    May 12, 2011

(30) Foreign Application Priority Data
Apr. 7, 2008 (DE) .......................... 10 2008 017 716

(51) Int. Cl.
*G06F 3/041* (2006.01)
*G06F 3/0488* (2013.01)

(52) U.S. Cl.
CPC .. *G06F 3/04883* (2013.01); *G06F 2203/04808* (2013.01)
USPC ........................................................ 345/173

(58) Field of Classification Search
CPC ................... G06F 2203/04808; G06F 3/04883
USPC .................................................. 345/173–184
See application file for complete search history.

(56) References Cited

U.S. PATENT DOCUMENTS 6,482,086 B1 * 11/2002 Rimoto et al. ..................... 463/1
6,573,883 B1 *  6/2003 Bartlett ........................... 345/156
(Continued)

FOREIGN PATENT DOCUMENTS

| | | | |
|---|---|---|---|
| CN | 1496411 A | 5/2004 | ............... C12M 1/00 |
| DE | 19811930 A1 | 9/1999 | ............... G06F 1/16 |

(Continued)

OTHER PUBLICATIONS

Hand Tracking Finger Identification and Chordic Manipulation on a Multi-touch Surface by Wayne Westerman, Ph.D dissertation, Spring 1999, University of Delaware, 333 pages.*

(Continued)

*Primary Examiner* — Quan-Zhen Wang
*Assistant Examiner* — Chun-Nan Lin
(74) *Attorney, Agent, or Firm* — King & Spalding L.L.P.

(57) ABSTRACT

A display device (3) is coupled to a touch-sensitive position detection unit (5) and a control unit (6) is coupled to the display device (3) and the position detection unit (5). The control unit has an evaluation logic (8) that evaluates touched positions (9) detected by the position detection unit (5) and uses the positions to influence the control of the representation of information on the display device (3) and the calling up of functions and/or the control of systems (11) that can be operated via the display and control device (1). The evaluation logic (8) is designed to evaluate the detected touched positions (9) in a time-resolved manner.

18 Claims, 4 Drawing Sheets

(56) References Cited

U.S. PATENT DOCUMENTS

| | | | |
|---|---|---|---|
| 6,681,031 B2* | 1/2004 | Cohen et al. | 382/103 |
| 6,950,534 B2* | 9/2005 | Cohen et al. | 382/103 |
| 7,084,859 B1* | 8/2006 | Pryor | 345/173 |
| 7,626,571 B2* | 12/2009 | Conti et al. | 345/156 |
| 7,668,340 B2* | 2/2010 | Cohen et al. | 382/103 |
| 7,834,847 B2* | 11/2010 | Boillot et al. | 345/156 |
| 8,169,410 B2* | 5/2012 | Hashimoto et al. | 345/173 |
| 8,312,479 B2* | 11/2012 | Boillot | 719/328 |
| 2003/0071858 A1 | 4/2003 | Morohoshi | 345/856 |
| 2003/0210235 A1* | 11/2003 | Roberts | 345/173 |
| 2004/0161132 A1* | 8/2004 | Cohen et al. | 382/103 |
| 2004/0227741 A1* | 11/2004 | Koda et al. | 345/183 |
| 2005/0012714 A1* | 1/2005 | Russo et al. | 345/157 |
| 2005/0046621 A1* | 3/2005 | Kaikuranta | 345/173 |
| 2005/0146511 A1* | 7/2005 | Hill et al. | 345/173 |
| 2006/0026521 A1* | 2/2006 | Hotelling et al. | 715/702 |
| 2006/0026536 A1* | 2/2006 | Hotelling et al. | 715/863 |
| 2006/0047386 A1* | 3/2006 | Kanevsky et al. | 701/36 |
| 2006/0066582 A1* | 3/2006 | Lyon et al. | 345/173 |
| 2006/0066588 A1* | 3/2006 | Lyon et al. | 345/173 |
| 2006/0101354 A1* | 5/2006 | Hashimoto et al. | 715/863 |
| 2006/0125799 A1* | 6/2006 | Hillis et al. | 345/173 |
| 2007/0125633 A1* | 6/2007 | Boillot | 200/52 R |
| 2007/0130547 A1* | 6/2007 | Boillot | 715/863 |
| 2007/0171194 A1* | 7/2007 | Conti et al. | 345/156 |
| 2008/0036743 A1* | 2/2008 | Westerman et al. | 345/173 |
| 2008/0052945 A1* | 3/2008 | Matas et al. | 34/173 |
| 2008/0100572 A1* | 5/2008 | Boillot | 345/158 |
| 2009/0074248 A1* | 3/2009 | Cohen et al. | 382/103 |
| 2009/0122018 A1* | 5/2009 | Vymenets et al. | 345/173 |
| 2009/0201246 A1* | 8/2009 | Lee et al. | 345/156 |
| 2010/0044120 A1* | 2/2010 | Richter | 178/18.01 |
| 2012/0113061 A1* | 5/2012 | Ikeda | 345/175 |

FOREIGN PATENT DOCUMENTS

| | | | |
|---|---|---|---|
| DE | 20020227 U1 | 4/2001 | B62B 1/04 |
| DE | 20212143 U1 | 1/2003 | B60R 16/02 |
| DE | 102007020593 | 11/2007 | G06F 3/00 |
| EP | 0813989 A1 | 12/1997 | B60K 37/06 |
| EP | 1475693 A2 | 11/2004 | G01C 21/36 |
| EP | 1717877 A2 | 11/2006 | H01L 51/52 |
| TW | 200619982 | 6/2006 | G06F 17/00 |
| WO | 2007/121977 A2 | 11/2007 | G05G 1/06 |

OTHER PUBLICATIONS

International PCT Search Report, PCT/EP2009/002772, 22 pages, Mailed Oct. 27, 2010.
International Preliminary Report on Patentability, PCT/EP2009/002772, 9 pages, Dec. 2, 2010.
German Search Report, DE102008017716.4, 4 pages, Mar. 16, 2010.

* cited by examiner

DISPLAY AND CONTROL DEVICE FOR A MOTOR VEHICLE AND METHOD FOR OPERATING THE SAME

CROSS-REFERENCE TO RELATED APPLICATIONS

This application is a U.S. National Stage Application of International Application No. PCT/EP2009/002772 filed Apr. 7, 2009, which designates the United States of America, and claims priority to German Application No. 10 2008 017 716.4 filed Apr. 7, 2008, the contents of which are hereby incorporated by reference in their entirety.

TECHNICAL FIELD

The invention relates to a display and control device of a motor vehicle as well as a method for operating such a display and control device. In particular, the invention relates to a display and control device, which comprises at least one display device and a touch-sensitive position detection unit coupled to the at least one display device by means of which touching actuations for detecting user inputs may be detected, as well as a method for operating such a display and control device, by means of which touching actuations are detected and evaluated.

BACKGROUND

Modern motor vehicles provide a plurality of comfort functions. Additionally and/or alternatively a plurality of systems exist which facilitate a use of a motor vehicle for the users and/or are to make it comfortable. The more complex the functions and/or systems become which have to be operated by the users, the more operating elements or the more complex operating elements are required. Since an installation space in motor vehicles provided for an arrangement of operating elements is limited, in particular multi-function operating devices are offered, which for example are formed as display and control devices. Particularly display and control devices, which comprise a display device and a touch-sensitive position detection unit coupled to the display device allow for operating a plurality of different systems internal to the vehicle and even external to the vehicle or temporary coupled to the vehicle as well as comfort functions. By means of a representation of information on the display area, it is possible to inform the user which function and/or action may be initiated and/or activated via touching the touch-sensitive position detection unit. Particularly preferred, the display device and the touch-sensitive position detection unit are integrated into a so-called touchscreen. In this connection, the touch-sensitive position detection unit is designed transparent and is arranged immediately in front of a display area of the display device. However, also other embodiments of display and control devices are feasible, in which a display device is coupled to a touch-sensitive position detection unit. Coupled to the display device and the touch-sensitive position detection unit is a control unit. On the one hand, it controls a display of information on the display area of the display device. On the other hand, the control unit comprises an evaluation logic, which evaluates the touched positions and for example correlates these with the information displayed on the display area to detect therefrom which function and/or action are to be initiated by a touching actuation. The control unit generates respective control signals to cause carrying out a function and/or an action.

By means of the known systems, function calls and/or action calls organized in hierarchical menu structures can be carried out. However, it is desirable to also allow intuitive and more complex operating actuations to allow for a quicker and not error-prone operation in the motor vehicle on the part of the users, in particular in order to not unnecessarily distract a driver from road traffic.

SUMMARY

Therefore, according to various embodiments, an improved display and control device of the above-contemplated type as well as an improved method for operating such a device can be created, which allow for the simpler and more intuitive operation of systems and/or functions in a motor vehicle.

According to an embodiment, a display and control device for a motor vehicle may comprise at least one display device, a touch-sensitive position detection unit coupled to the at least one display device, and a control unit coupled to the at least one display device and the position detection unit and comprising an evaluation logic which evaluates touched positions detected by the position detection unit and hereby influences a control of a representation of information on the at least one display device and a calling up of functions and/or a control of systems that can be operated via the display and control device, wherein the evaluation logic is designed to evaluate the detected touched positions in a time-resolved manner.

According to a further embodiment, the detected touched positions which temporally one after the other continuously merge into a touch trace can be combined and the evaluation logic may comprise at least one differentiator, which detects a speed and/or a acceleration of a grazing actuation movement generating the touch trace, and the manipulation of the control differs for different detected speeds and/or accelerations. According to a further embodiment, the one touch-sensitive position detection unit can be designed to detect the touched positions of at least two, preferably several simultaneously occurring touches spaced apart from each other, and the evaluation logic is designed to evaluate the differing touched positions in coincidence. According to a further embodiment, the evaluation logic can be designed to evaluate in each case a direction of the touch trace and/or a form of the touch trace and/or a speed of a grazing actuation movement generating the touch trace and/or an acceleration of the grazing actuation movement (grazing acceleration) generating the touch trace in order to identify a gesture. According to a further embodiment, the evaluation logic can be designed to evaluate several simultaneously detected touch traces with respect to predetermined patterns to identify differing gestures and to influence the control according to the identified gestures. According to a further embodiment, the control unit can be designed to assign physical properties to objects displayed on the display area, and the evaluation logic detects an operating impulse on the basis of a detected acceleration, with which the grazing actuation movement generating the touch trace is accomplished, and at least one direction of the touch trace as well as where applicable further properties of the touch trace and/or the movement generating the touch trace, and an object, in whose display area or activation area the touch trace starts, is moved on the display device according to a trajectory calculated on the basis of the assigned physical properties and the detected operating impulse. According to a further embodiment, at least one second further display area formed separate from a display area of the at least one display device can be provided for and the control unit is designed to display an object, whose trajectory by a predetermined minimum length points out of the display area in a direction in which the at least one further display area is located, on the further display area. According to a further embodiment, a touched position detected in a display area or activation area of an object displayed on the display device may only cause an initiation of a function assigned to the object when the touched position is a point of origin of a touch trace. According to a further embodiment, in the case of several simultaneously detected touch traces taking a course approximately in parallel towards each other the detected operating impulse and/or a detected operating speed and/or a detected touch trace length of one of the touch traces are increased, preferably multiplied.

According to another embodiment, a method for operating a display and control device of a motor vehicle, wherein the display and control device comprises a display device, a touch-sensitive position detection unit coupled to the at least one display device and a control unit coupled to the at least one display device and the position detection unit, may comprise the steps of: detecting touched positions by means of the touch-sensitive position detection unit, evaluating the detected touched positions by means of an evaluation logic of the control unit, controlling a representation of information on the at least one display device and calling up functions and/or a control of systems that can be operated via the display and control device, each depending on the result of the evaluation of the detected touched positions, wherein the detected touched positions are evaluated in a time-resolved manner.

According to a further embodiment of the method, the temporally one after the other continuously merging detected touched positions can be combined into a touch trace and the evaluation logic by means of at least one differentiator determines a speed and/or an acceleration of a grazing actuation movement generating the touch trace, and a result of the evaluation is different for different detected speeds and/or accelerations. According to a further embodiment of the method, by means of the touch-sensitive position detection unit touched positions of at least two, preferably several simultaneously occurring touches spaced apart from each other can be detected and the differing touched positions can be evaluated in coincidence by means of the evaluation logic. According to a further embodiment of the method, the evaluation may detect a direction of the touch trace and/or a form of the touch trace and/or a speed of a grazing actuation movement generating the touch trace and/or an acceleration of the grazing actuation movement (grazing acceleration) generating the touch trace to identify a gesture dependent therefrom. According to a further embodiment of the method, several simultaneously detected touch traces can be evaluated with respect to predetermined patterns to identify different gestures. According to a further embodiment of the method, physical properties can be assigned to objects displayed on a display area on the basis of a detected acceleration, with which a grazing actuation movement generating the touch trace is accomplished, and from at least one direction of the touch trace as well as where applicable from further properties of the touch trace and/or a movement generating the touch trace an operating impulse is detected, and an object, in whose display area or activation area the touch trace begins, is moved on the display device according to a trajectory calculated on the basis of the assigned physical properties and the detected operating impulse. According to a further embodiment of the method, the display and control device may comprise at least two display areas formed separate from each other, and an object, whose trajectory points out of one of the display areas by a predetermined minimum length in a direction in which the at least one other of the display areas is located, is displayed in the other of the at least two display areas. According to a further embodiment of the method, for a touched position detected in a display area or an activation area of an object displayed on the display device an initiation of a function assigned to the object only can be caused when the touched position is a point of origin of a touch trace. According to a further embodiment of the method, the evaluation logic in the case of several simultaneously detected touch traces which take a course approximately in parallel towards each other detects the detected operating impulse and/or a detected operating speed and/or a detected touch trace length of one of the touch traces and the respective values of the one touch trace can be increased, preferably multiplied.

BRIEF DESCRIPTION OF THE DRAWINGS

In the following, the invention is described in more detail by means of an exemplary embodiment with respect to a drawing. In this connection.

DETAILED DESCRIPTION

Figure 1:
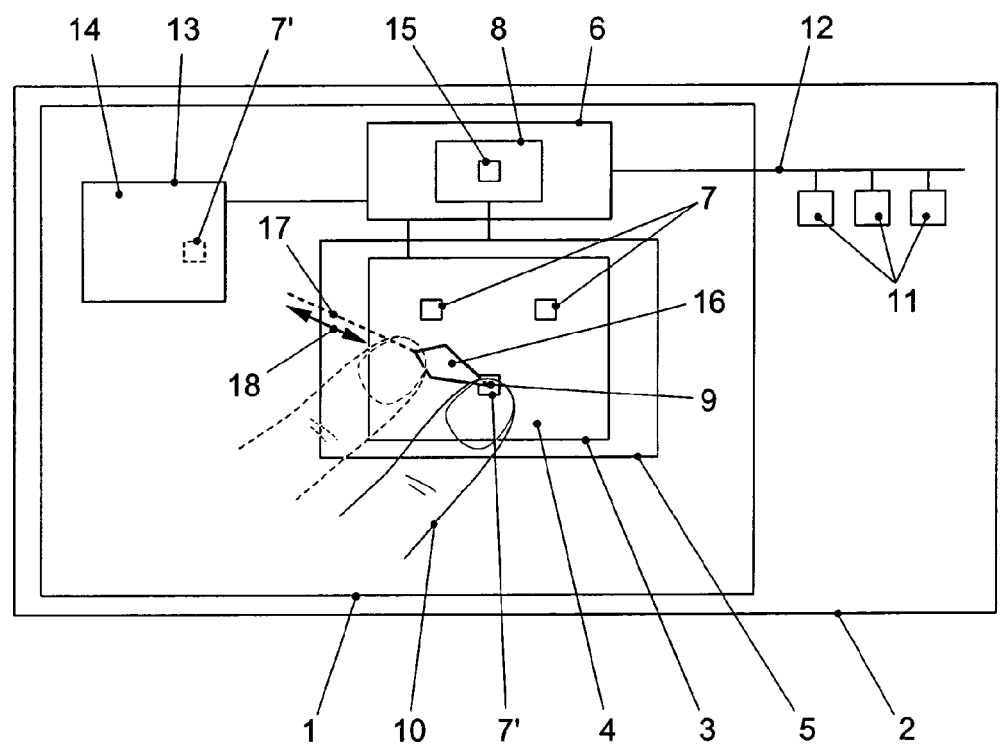
FIG. 1 shows a schematic illustration of a display and control device.
Figure 2A:
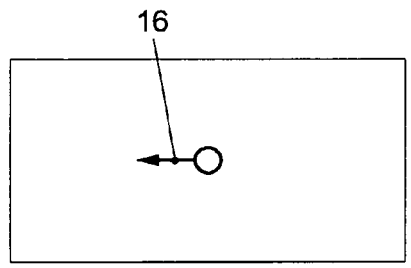
FIGS. 2a-h show schematic illustrations of touch gestures, which are carried out by means of an actuation element.
Figure 2B:
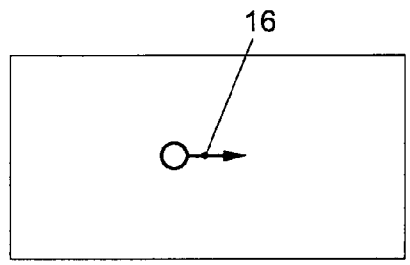
Figure 2C:
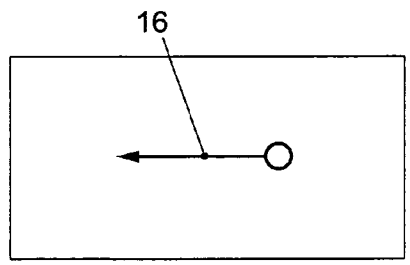
Figure 2D:
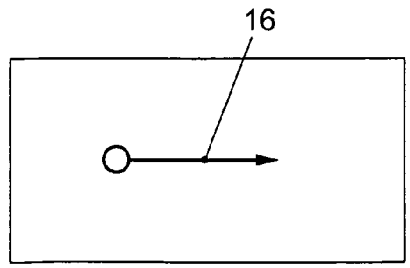
Figure 2E:
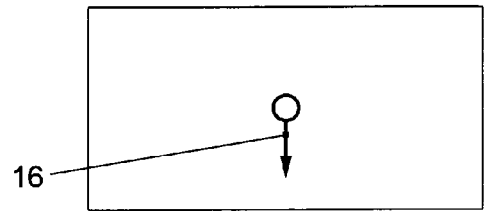
Figure 2F:
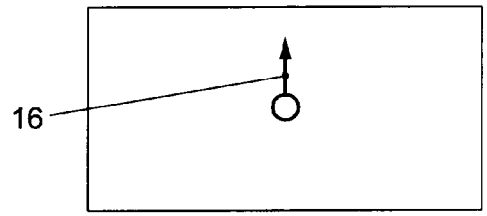
Figure 2G:
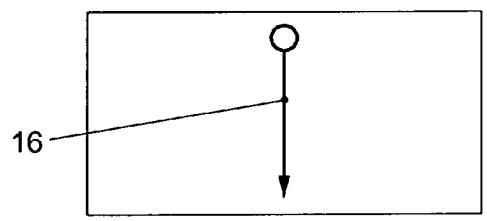
Figure 2H:
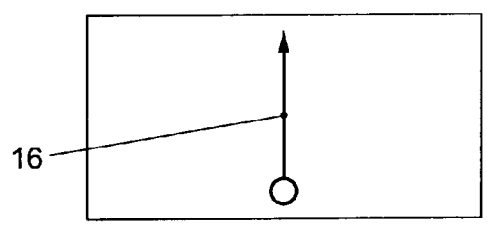
Figure 3A:
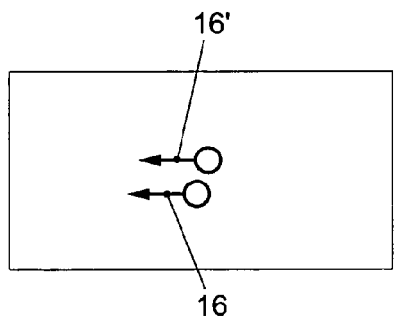
FIGS. 3a-h show schematic illustrations of touch gestures, which are carried out by means of two actuation elements.
Figure 3E:
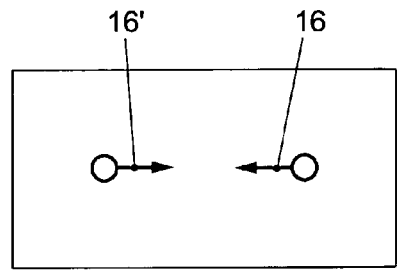
Figure 3B:
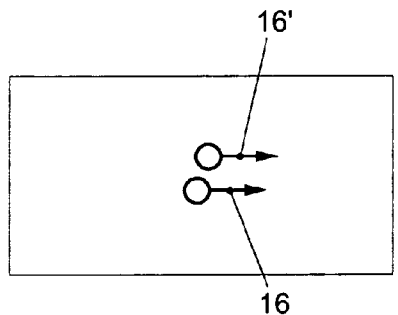
Figure 3F:
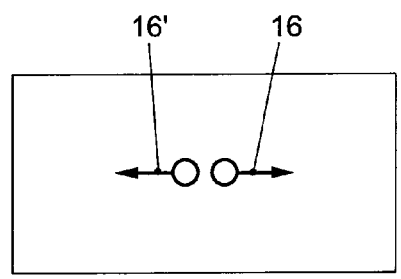
Figure 3C:
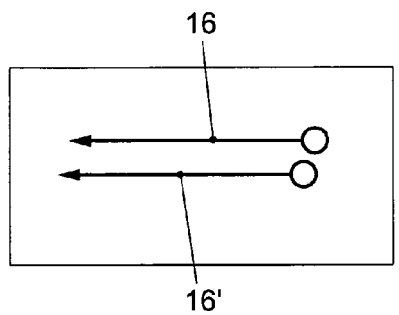
Figure 3G:
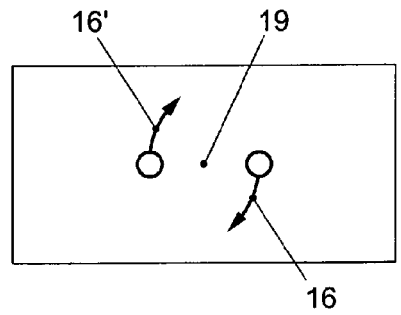
Figure 3D:
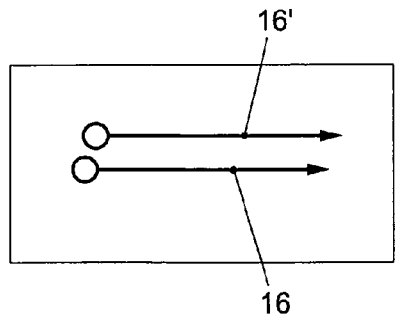
Figure 3H:
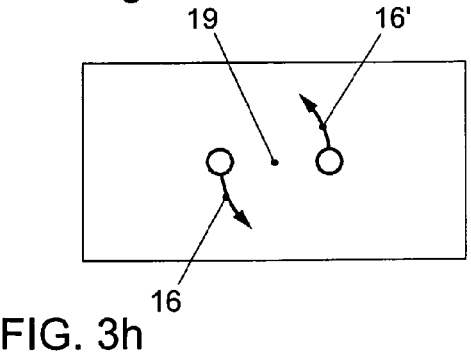

According to various embodiments, it is provided for to create a display and control device for a motor vehicle which comprises at least one display device, a touch-sensitive position detection unit coupled to the at least one display device and a control unit coupled to the at least one display device and the position detection unit, wherein the control unit comprises an evaluation logic which evaluates touched positions detected by the position detection unit and hereby influences a control of a representation of information on the display device and a calling up of functions and/or control of systems that can be operated via the display and control device, wherein the evaluation logic is designed to evaluate the detected touched positions in a time-resolved manner. An evaluation of the touched positions in a time-resolved manner allows for additional information, in particular to detect and to evaluate selectively touching movements of the users grazing the position detection unit. Through these, detected and evaluated may be courses of a motion of an actuation element of a user, which normally will be a finger, and may be used for operation and/or control of functions or systems. A diversity of the possible actuation actions is increased thereby, so that a larger number of different actuation intentions of a user may be detected without an increase of the amount of displayed information.

In an embodiment it is provided for, that the detected touched positions, which temporally continuously merge one after the other, are combined into a touch trace and the evaluation logic comprises at least one differentiator which detects a speed and/or an acceleration of a grazing actuation movement generating the touch trace, and the manipulation of the control is different for different detected speeds and/or accelerations. Besides a form, a so-called touch trace, evaluated here is a speed or an acceleration of the movement of the actuation element with which it touches the position detection unit in a grazing manner. This again increases a number of possible discriminable actuation actions and thus user inputs.

A number of the detectable and discriminable user actuation actions is further increased when the touch-sensitive position detection unit is designed to detect the position of at least two, preferably several simultaneously occurring touches that are spaced apart from each other, and the evaluation logic is designed to evaluate the different touched positions in coincidence. Here, to evaluate in coincidence is understood to mean that a temporal correlation of the touch traces generated by touched positions spaced apart from each other is carried out. For example, when a user touches the touch-sensitive position detection unit simultaneously with two lightly splayed fingers and carries out a grazing movement by those, then two simultaneous, i.e. in coincidence, detected touch traces are recognized by the evaluation logic. From this, the evaluation logic detects a user input, which differs from a user input in which the same touch traces are detected temporally separated one after the other via the touch-sensitive position detection unit.

The actuation actions carried out by users may also be denominated as touch gestures. In order to discriminate these, it is provided for in an embodiment that the evaluation logic is designed to evaluate in each case a direction of the touch trace and/or a form of the touch trace and/or a speed of a grazing actuation movement (a grazing speed) generating the touch trace and/or an acceleration of the grazing actuation movement (grazing acceleration) generating the touch trace, in order to identify a gesture. When a touch occurs by several actuation elements touching the position detection unit spaced apart from each other, then of course the individual touch traces are evaluated individually as well as in correlation with each other with respect to the denoted characteristics.

In a further advanced embodiment it is provided for, that the evaluation logic is designed to evaluate several touch traces detected simultaneously (in coincidence) with respect to predetermined patterns in order to identify different gestures and to influence the control according to the identified gestures. A pattern recognition makes it possible to classify similar touch trace patterns and thus to facilitate a recognition of gestures. For example, two different users carrying out "the same gesture" will generate different touch traces, since their hands are formed anatomically different. When a straight grazing touch of the position detection unit is carried out by two fingers spaced apart from each other crosswise to the operating direction, then a distance for example depends on the anatomy and physiognomy of the different users. Pattern recognition enables to classify these differing touch trace patterns in a simple manner and to identify them as the same gesture.

In order to configure an operation of the display and control device as well as a control of systems and/or functions in an intuitive manner it is desirable to be able to move representation objects, i.e. information displayed on the display area of the display device, on this display area. In order to allow for a movement of objects adapted to a real world scenario it is provided for in an embodiment, that the control unit is designed to assign physical properties to objects displayed on the display area and the evaluation logic determines an operating impulse on the basis of a detected acceleration a grazing actuation movement generating the touch trace is carried out with, and at least one direction as well as where applicable further properties of the touch trace and/or the movement generating the touch trace, and an object, in whose display area or activation area the touch trace originates, is moved on the display device according to a trajectory calculated on the basis of the assigned physical properties and the detected operating impulse. For example, assigned to a displayed object may be an inertia as well as a coefficient of friction or adhesion factor by which the object may be moved across the display area. By means of an acceleration, which an actuation element carries out during generating the touch trace, an operating impulse is assigned to an object in whose display and activation area, respectively, the generated touch trace has its point of origin. Regarded as an activation area is that area around a display area of an object in which a touched position is assigned to the object. Particularly with small objects it may be provided for, that an activation area is larger than a display area of the object. Thereby, a targeting accuracy with respect to a touch of the object by a user is increased.

In embodiments in which the display and control device comprises at least two display areas formed separate from each other, the control unit can be designed to determine a trajectory by a predetermined minimum length points out of one of the display areas into a direction in which the at least one other display area is located, the object is then displayed in the other of the at least two display areas. A trajectory comprises the information at which location the object is displayed at a certain point in time. Besides the geometric form of a curve traversed by the object, thus also an information is included with which speed and acceleration and deceleration, respectively, the object is moving along this curve. When a calculated trajectory is formed such, that the trajectory by a minimum length points out of the one display area in which the object initially is located, i.e. that at least a part of the object, preferably the whole object, is moved out of the display area during the movement along the trajectory, then the object is moved into a display area separate from the first display area provided that it is located at least approximately in the direction relative to the first display area into which the trajectory points upon leaving and/or outside of the first display area.

In order to render possible a completion of manifold gestures by users for detecting user inputs without carrying out and outputting, respectively, all functions or control commands here which are linked to objects displayed on the display area and are intersected by a touch trace, it is provided for in an embodiment, that a touched position detected in a display area or activation area of an object displayed on the display device only causes initiation of a function assigned to the object when the touched position is a point of origin of a touch trace.

Furthermore, further prerequisites may be established for the touch trace in order to cause an initiation of an assigned function.

In an embodiment it is provided for, that in several simultaneously detected (coincidental) touch traces approximately running in parallel the detected operating impulse and/or a detected speed and/or an acceleration of a grazing actuation movement generating the touch trace and/or a detected touch trace length of one of the touch traces are increased, preferably multiplied. Generating two or more parallel touch traces, i.e. conducting two or more actuation elements in parallel, which touch the position detection unit simultaneously, is regarded as a gesture identical to a gesture, which is carried out by one actuation element. However, conducting several actuation elements in parallel is regarded to be a reinforcement of this gesture. A straight running touch trace, which for example may be regarded to be a scrolling gesture in a listing, for example is reinforced in that scrolling through the listing takes place faster or in larger steps.

The characteristics of the method according to various embodiments have the same advantages as the respective characteristics of the display and control device.

Schematically illustrated in FIG. 1 is a display and control device 1 in a motor vehicle 2. The display and control device 1 comprises a display device 3 comprising a display area 4. Arranged in front of the display area 4 of the display device 3 is a touch-sensitive position detection unit 5. The position detection unit 5 preferably is formed as a touchscreen together with display device 3. Particularly preferred, the touch-sensitive position detection unit 5 is formed such, that it may detect touches occurring at different positions simultaneously and may determine the respective touched positions.

The display device 3 as well as the touch-sensitive position detection unit 5 are coupled to a control unit 6. On the one hand, this controls a representation of objects 7, which are displayed on the display area 4 of the display device 3. These objects 7 may for example be formed as virtual operating elements. The control unit 6 further comprises an evaluation logic 8, which evaluates the touched positions 9 of an actuation element 10. The evaluation logic may be implemented in different ways, for example by means of a hard-wired circuit or a device implemented in hard- and software. The evaluation logic is arranged to evaluate the detected touched positions in a time-resolved manner. Detected touched positions temporally immediately succeeding one after the other, which strung together result in a continuous curve, are combined into a touch trace. The evaluation logic preferably is arranged such that it classifies the touch trace by means of pattern recognition to identify a gesture. When an actuation action is carried out by means of two actuation elements (not shown), so that two touch traces are generated simultaneously (coincidental), then these are evaluated individually and/or in correlation to identify one or more gestures.

By means of the identified gesture a manipulation and control of functions or systems 11 carried out via the control unit 6 is influenced, wherein the functions or systems for example are connected with the control unit 6 via a vehicle data bus 12. The systems 11 may be systems internal to the vehicle, external to the vehicle or temporarily coupled to the vehicle, for example a MP3-Player or the like connected via a wire lead interface.

In the embodiment displayed, the display and control device 1 comprises a further display device 13 comprising a further display area 14. The further display device 13 also is coupled to the control unit 6. The display and control device 1 is formed such, that the evaluation logic 8 at least comprises one differentiator 15, which evaluates a touch trace 16 generated by the touched positions 9 to that effect with which speed and which acceleration, respectively, the grazing movement of the actuation element 10 generating the touch trace 16 is carried out. In FIG. 1 the touch trace is illustrated as a broadening arrow to represent a direction of the generating movement as well as a speed or alternatively an acceleration of the movement generating the touch trace 16. The object 7', in whose display area the touch trace 16 has its point of origin, is moved on the display area by the grazing accelerated movement of the actuation element. The acceleration of the generating movement is detected by the differentiator. Assigned to the object 7' are physical properties, in particular an inertia and an adhesion factor. Through these it is possible to calculate, on the basis of physical laws of motion, a trajectory 17 along which the object 7' would move, if it would have been brought into movement by the actuation element according to the touch trace. The calculated trajectory 17 is illustrated in a dotted manner. The trajectory 17 points outward from the display area 4 of the display device 3. In doing so a minimum distance is exceeded which is indicated by a double arrow 18. The trajectory 17 points in the direction of the further display area 14. The evaluation logic 8 is formed such, that in such a case the control unit 6 is manipulated such, that the object subsequently is displayed in the further display area 14 as indicated in a dashed manner.

The mode of operation of the display and control device of FIG. 1 is described in an example for a touch gesture. It unfolds for a person skilled in the art, that a plurality of further touch gestures is possible. It also unfolds for a person skilled in the art, that also embodiments are conceivable which comprise only one display device and display area, respectively, or more than two display devices and display areas, respectively.

Depicted in FIGS. 2a-2h are different touch gestures, which may be carried out by means of an actuation element, for example a finger of a user. The gestures are discriminated with respect to their touch trace length and their direction.

Depicted in FIGS. 3a-3h are examples of touch gestures which may be carried out by means of two actuation elements, for example two fingers and a thumb and a finger, respectively. The gestures 2a-2d each show two parallel touch traces 16, 16' that differ with respect to their length and/or direction in which they are traversed. The touch gestures displayed in FIGS. 3e and 3f may for example be generated by means of bringing together and splaying, respectively, two fingers, and a finger and the thumb, respectively. The gestures according to FIGS. 3g and 3h arise by a circular movement of two actuation elements about a shared center 19 and differ with respect to their sense of rotation in a clockwise (FIG. 3g) and a counter-clockwise (FIG. 3h) direction.

Figure 4:
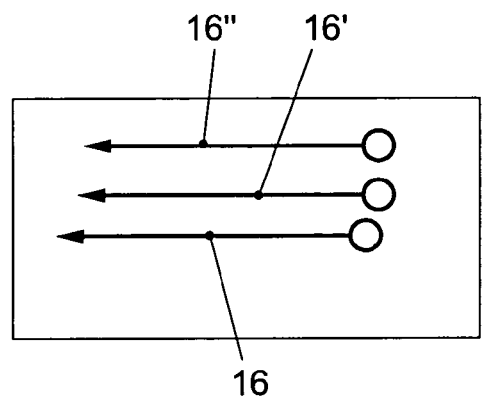
FIG. 4 shows a schematic illustration for describing a reinforcement of a gesture by conducting several actuation elements in parallel.

In an embodiment it is provided for, that a parallel conducting of several actuation elements is to effect a reinforcement of a gesture, which is generated by solely one actuation element. This is to be described briefly on the basis of FIG. 4. With the gesture displayed there, three actuation elements are moved in parallel from right to left across the touch-sensitive position detection unit, so that three parallel touch traces 16, 16', 16" occur in coincidence. For example, if the identified gesture is used to determine a length of a fast-forward within a track during a replay of a music track by means of a MP3-Player operated via the display and control device, then, by means of the depicted "triple-gesture", it is fast-forwarded three times as far within the track as if a single touch trace 16 would have been generated by an actuation using only one actuation element.

Figure 5A:
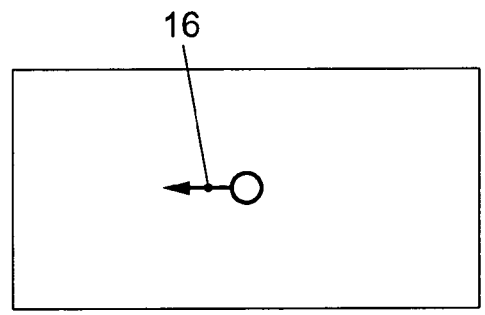
FIGS. 5a, 5b show schematic illustrations of two gestures that are generated using differing speeds of movement and/or accelerations of movement of an actuation element conducting the gesture.
Figure 5B:
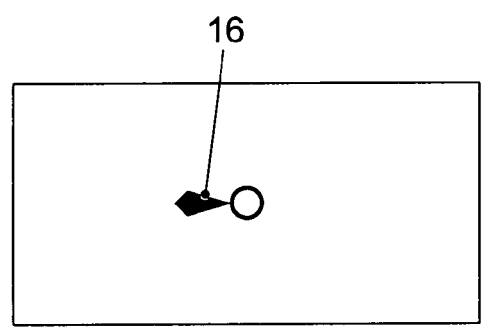

Finally, schematically indicated in FIGS. 5a and 5b are two touch traces which differ in that they are carried out by means of differently accelerated movements. While the grazing actuation, which led to the touch trace of FIG. 5a, is conducted using a constant speed, the movement of the actuation element that led to the touch trace of FIG. 5b has been carried out using acceleration. This is indicated by a broadening of the arrow symbolizing the touch trace 16. A length of the touch traces 16 of FIGS. 5a and 5b is equal, however, a time-differentiated evaluation of the touched positions resulting in the touch trace 16 allow for a discrimination of the touch traces 16.

The described gestures and their use for forming user interfaces in a motor vehicle are merely exemplary and are not to be construed in a limiting manner.

REFERENCE NUMERALS 1 display and control device
2 motor vehicle 3 display device
4 display area
5 touch-sensitive position detection unit
6 control unit
7, 7' objects
8 evaluation logic
9 touched positions
10 actuation element
11 systems
12 vehicle data bus
13 further display device
14 further display area
15 differentiator
16 touch trace
17 trajectory
18 double arrow
19 center

What is claimed is:

1. A display and control device for a motor vehicle, comprising:
at least one display device of the motor vehicle,
a touch-sensitive position detection unit coupled to the at least one display device, and
a control unit coupled to the at least one display device and the position detection unit and comprising an evaluation logic which evaluates touched positions detected by the position detection unit and hereby influences a control of a representation of information on the at least one display device and a calling up of at least one of functions and a control of systems that can be operated via the display and control device,
wherein the control unit assigns corresponding physical properties to a plurality of objects displayed on a display area of the at least one display device of the motor vehicle, the assigned physical properties related to a value for inertia or friction of each one of the plurality of objects affecting movement of the discrete object on the display area in combination with a detected operating impulse;
wherein the evaluation logic is operable to:
evaluate the detected touched positions in a time-resolved manner; and
identify at least one sequential series of detected touched positions that continuously merge into a touch trace generated by a grazing actuation movement across the display area of the at least one display device; and
wherein the evaluation logic includes a differentiator configured to detect, for each identified touch trace, at least one of a speed and an acceleration of the respective touch trace, and control a representation of information on the at least one display device based on the detected at least one of a speed and an acceleration of each identified touch trace.

2. The display and control device according to claim 1, wherein the one touch-sensitive position detection unit is operable to detect the touched positions of at least two simultaneously occurring touches spaced apart from each other, and the evaluation logic is operable to evaluate the differing touched positions in coincidence.

3. The display and control device according to claim 1, wherein the evaluation logic is operable to evaluate at least one of a direction of the touch trace, a form of the touch trace, a speed of a grazing actuation movement generating the touch trace, and an acceleration of the grazing actuation movement (grazing acceleration) generating the touch trace, respectively in order to identify a gesture.

4. The display and control device according to claim 1, wherein the evaluation logic is operable to evaluate a plurality of simultaneously detected touch traces with respect to predetermined patterns to identify differing gestures and to influence the control according to the identified gestures.

5. The display and control device according to claim 1, wherein the evaluation logic detects an operating impulse on the basis of a detected acceleration, with which the grazing actuation movement generating the touch trace is accomplished, and at least one direction of the touch trace as well as where applicable further properties of at least one of the touch trace and the movement generating the touch trace, and an object, in whose display area or activation area the touch trace starts, is moved on the display device according to a trajectory calculated on the basis of the assigned physical properties and the detected operating impulse.

6. The display and control device according to claim 1, wherein at least one second further display area formed separate from a display area of the at least one display device is provided for and the control unit is designed to display an object, whose trajectory by a predetermined minimum length points out of the display area in a direction in which the at least one further display area is located, on the further display area.

7. The display and control device according to claim 1, wherein a touched position detected in a display area or activation area of an object displayed on the display device causes an initiation of a function assigned to the object only if the touched position is a point of origin of a touch trace.

8. The display and control device according to claim 1, wherein in the case of more than one simultaneously detected touch traces taking a course substantially in parallel towards each other, at least one of the detected operating impulse, a detected operating speed, and a detected touch trace length of one of the touch traces are increased.

9. The display and control device according to claim 1, wherein in the case of more than one simultaneously detected touch traces taking a course substantially in parallel towards each other, at least one of the detected operating impulse, a detected operating speed, and a detected touch trace length of one of the touch traces are multiplied.

10. A method for operating a display and control device of a motor vehicle, wherein the display and control device comprises a display device, a touch-sensitive position detection unit coupled to the display device and a control unit coupled to the display device and the position detection unit, wherein the method comprises the steps of:
detecting touched positions by the touch-sensitive position detection unit of the motor vehicle,
evaluating the detected touched positions by an evaluation logic of the control unit of the motor vehicle,
assigning corresponding physical properties to a plurality of objects displayed on a display area of the display device of the motor vehicle based on the evaluation of the detected touched positions, the assigned physical properties related to a value for inertia or friction of each one of the plurality of objects affecting movement of the discrete object on the display area in combination with a detected operating impulse;
identifying, by the evaluation logic of the control unit, at least one sequential series of detected touched positions that continuously merge into a touch trace generated by a grazing actuation movement across the display area of the at least one display device; and applying, by the evaluation logic of the control unit, a differentiation algorithm to detect, for each identified touch trace, at least one of a speed and an acceleration of the respective touch trace, and, based on the detected at least one of a speed and an acceleration of each identified touch trace, to at least one control a representation of information on the at least one display device and control a system that can be operated via the display and control device.

11. The method according to claim 10, comprising detecting touched positions of at least two simultaneously occurring touches spaced apart from each other by the touch-sensitive position detection unit and evaluating the differing touched positions in coincidence by the evaluation logic.

12. The method according to claim 10, wherein the evaluation detects at least one of a direction of the touch trace, a form of the touch trace, a speed of a grazing actuation movement generating the touch trace, and an acceleration of the grazing actuation movement (grazing acceleration) generating the touch trace to identify a gesture dependent therefrom.

13. The method according to claim 10, wherein a plurality of simultaneously detected touch traces are evaluated with respect to predetermined patterns to identify different gestures.

14. The method according to claim 10, further comprising assigning physical properties to objects displayed on a display area on the basis of a detected acceleration, with which a grazing actuation movement generating the touch trace is accomplished, and detecting an operating impulse from at least one direction of the touch trace as well as where applicable further properties of at least one of the touch trace and a movement generating the touch trace, and moving an object, in whose display area or activation area the touch trace begins, on the display device according to a trajectory calculated on the basis of the assigned physical properties and the detected operating impulse.

15. The method according to claim 10, wherein the display and control device comprises at least two display areas formed separate from each other, and an object, whose trajectory points out of one of the display areas by a predetermined minimum length in a direction in which the at least one other of the display areas is located, is displayed in the other of the at least two display areas.

16. The method according to claim 10, wherein for a touched position detected in a display area or an activation area of an object displayed on the display device an initiation of a function assigned to the object is caused only if the touched position is a point of origin of a touch trace.

17. The method of according to claim 10, further comprising detecting by the evaluation logic, in the case of more than one simultaneously detected touch traces which take a course substantially in parallel towards each other, at least one of the detected operating impulse, a detected operating speed, a detected touch trace length of one of the touch traces and increasing the respective values of the one touch trace.

18. The method of according to claim 10, further comprising detecting by the evaluation logic, in the case of more than one simultaneously detected touch traces which take a course substantially in parallel towards each other, at least one of the detected operating impulse, a detected operating speed, a detected touch trace length of one of the touch traces and multiplying the respective values of the one touch trace.

* * * * *